United States Patent [19]
Bolduc et al.

[11] Patent Number: 5,343,381
[45] Date of Patent: Aug. 30, 1994

[54] ELECTRICAL DAMPENING CIRCUIT FOR DAMPENING RESONANCE OF A POWER SIGNAL IN A POWER DISTRIBUTION NETWORK

[75] Inventors: Léonard Bolduc, Ste-Julie; Grégoire Paré, St-Bruno, both of Canada

[73] Assignee: Hydro-Quebec, Montreal, Canada

[21] Appl. No.: 22,320

[22] Filed: Feb. 25, 1993

[51] Int. Cl.$^5$ .................. H02M 1/12; H02H 7/06
[52] U.S. Cl. ..................... 363/47; 307/105; 333/175; 333/181
[58] Field of Search ............. 363/47, 48; 333/172, 333/173, 175, 181; 307/102, 105

[56] References Cited

U.S. PATENT DOCUMENTS

| | | |
|---|---|---|
| 3,535,542 | 10/1970 | Gilsig . |
| 3,881,137 | 4/1975 | Thanawala ............. 307/105 |
| 4,209,757 | 6/1980 | Becker ............. 307/105 X |
| 4,262,256 | 4/1981 | Blais et al. ............. 323/223 |
| 4,620,144 | 10/1986 | Bolduc ............. 323/331 |
| 4,724,333 | 2/1988 | Hedin ............. 307/105 |
| 4,766,365 | 8/1988 | Bolduc et al. ............. 323/308 |
| 4,808,843 | 2/1989 | Hedin ............. 307/105 |
| 4,843,513 | 6/1989 | Edris ............. 307/105 X |
| 4,864,484 | 9/1989 | Krueger et al. ............. 307/105 X |
| 4,939,486 | 7/1990 | Bergdahl et al. ............. 307/105 X |
| 5,262,677 | 11/1993 | Ramirez ............. 307/105 |

OTHER PUBLICATIONS

Kumar et al., "Capacitor Voltage Transformer Induced Ferroresonance—Causes, Effects and Design Considerations," *Electric Power Systems Research*, 1991, pp. 23–31.

Wilde et al., "Customer Service Direct from Transmission Lines," *IEEE Transactions on Power Apparatus and Systems*, vol. PAS-99, No. 1, Jan./Feb. 1980, pp. 301–306.

Sarmiento et al., "Solving Electric Energy Supply to Rural Areas: The Capacitive Voltage Divider," *IEEE Transactions on Power Delivery*, vol. 5, No. 1, Jan. 1990, pp. 259–265.

Bouchard, "The Capacitive Substation," 1992, pp. 1–16.

Trench Electric, "Manual d'instruction des Transformateurs de Tension Capacitifs et des Condensateurs de Couplage," Bulletin IM300-05, Feb. 1980, pp. 1–18.

*Primary Examiner*—Emanuel T. Voeltz
*Attorney, Agent, or Firm*—Foley & Lardner

[57] ABSTRACT

The electrical dampening circuit for dampening resonance of a power signal in a power distribution network, comprises a capacitor C, an inductance L connected in parallel to capacitor C, and a resistance R connected in series with capacitor C and inductance L, values of capacitor C and inductance L being calculated so that $(2\pi f)^2 LC = 1$, where f is frequency of the power signal. The value of R is calculated so that $3\sqrt{L/C} < R < (\frac{2}{3})\sqrt{L/C}$ whereby dampening of resonance is obtained.

11 Claims, 6 Drawing Sheets

ELECTRICAL DAMPENING CIRCUIT FOR DAMPENING RESONANCE OF A POWER SIGNAL IN A POWER DISTRIBUTION NETWORK

FIELD OF THE INVENTION

The present invention is concerned with an electrical dampening circuit for dampening resonance of a power signal in a power distribution network. More specifically, the present invention can be used combination with a capacitive coupling system.

BACKGROUND OF THE INVENTION

It is known in the art that the combination of a capacitive coupling system and a nonlinear magnetizing inductance of the isolating transformer of a capacitor voltage transformer can cause a variety of nonlinear oscillations. This problem is discussed in the publication of KUMAR, B.S.A. and SUAT ERTEM, "Capacitive Voltage Transformer Induced Ferroresonance-Causes, Effects and Design Considerations" Electric Power Systems Research 21, (1991) 23-31. The problem of resonance discussed in the above-mentioned publication has not been solved in a simple and efficient manner.

OBJECT OF THE PRESENT INVENTION

It is an object of the present invention to provide an electrical dampening circuit for dampening resonance of a power signal in a power distribution network.

It is a preferable object of the present invention to provide a dampening circuit for dampening resonance of a power signal in a power distribution network, in combination with a capacitive coupling system.

SUMMARY OF THE INVENTION

According to the present invention, there is provided an electrical dampening circuit for dampening resonance of a power signal in a power distribution network, comprising a capacitor C, an inductance L connected in parallel to said capacitor C, and a resistance R connected in series with said capacitor C and inductance L, values of said capacitor C and inductance L being calculated so that:

$$(2\pi f)^2 LC = 1,$$

where f is frequency of said power signal; value of R being calculated so that:

$$3\sqrt{L/C} < R < (2/3)\sqrt{L/C},$$

whereby dampening of said resonance is obtained.

The objects, advantages and other features of the present invention will become more apparent upon reading of the following non restrictive description of preferred embodiments thereof, given for the purpose of exemplification only with reference to the accompanying drawings.

DETAILED DESCRIPTION OF THE DRAWINGS

Figure 1:
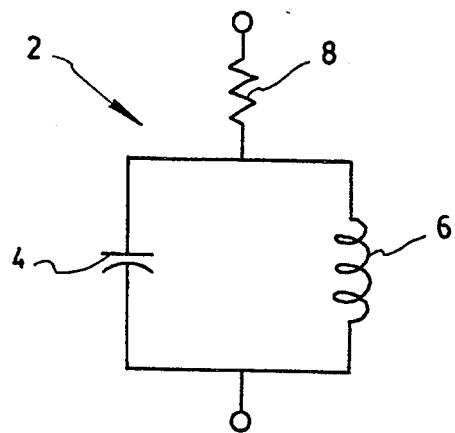
FIG. 1 is a circuit diagram illustrating the electrical dampening circuit itself.

Referring now to FIG. 1, there is shown an electrical dampening circuit 2 for dampening resonance of a power signal in a power distribution network. The dampening circuit comprises a capacitor C 4 and inductance L 6 connected in parallel to the capacitor C 4, and a resistance R 8 connected in series with capacitor C 4 and inductance L 6. Values of capacitor C 4 and inductance L 6 are calculated so that $(2\pi f)^2 LC = 1$, where f is frequency of the power signal. The value of R 8 is calculated so that $3\sqrt{L/C} < R < (\frac{2}{3})\sqrt{L/C}$, whereby dampening of the resonance is obtained. More preferably, $2\sqrt{L/C} < R < \sqrt{L/C}$.

It can be seen that the values of L 6 and C 4 are such that $\omega^2 LC = 1$, where $\omega$ is the typical operating angular frequency of the power distribution network which supplies the system in which the dampening circuit operates. The value of R is close to the critic resistance $R_c$ calculated from the equation $R_c = 2\sqrt{L/C}$ so that $R_c = 2\omega L = 2/(\omega C)$. Thus, the circuit has a high impedance when operating at frequency $\omega$ but this impedance becomes low at other frequencies, which can be generated by resonances, by ferroresonance or by beatings in the circuits to which the dampening circuit is connected. Resistance R is then submitted to a higher current which produces in said resistance R losses to obtain a dampening effect of frequencies different of frequency $\omega$. Inductance L can be provided by an inductance with an air core which is a linear inductance, or by an inductance having a ferrite or transformer steel core which can be saturated when it is operating above its nominal voltage at its nominal frequency.

Figure 2:
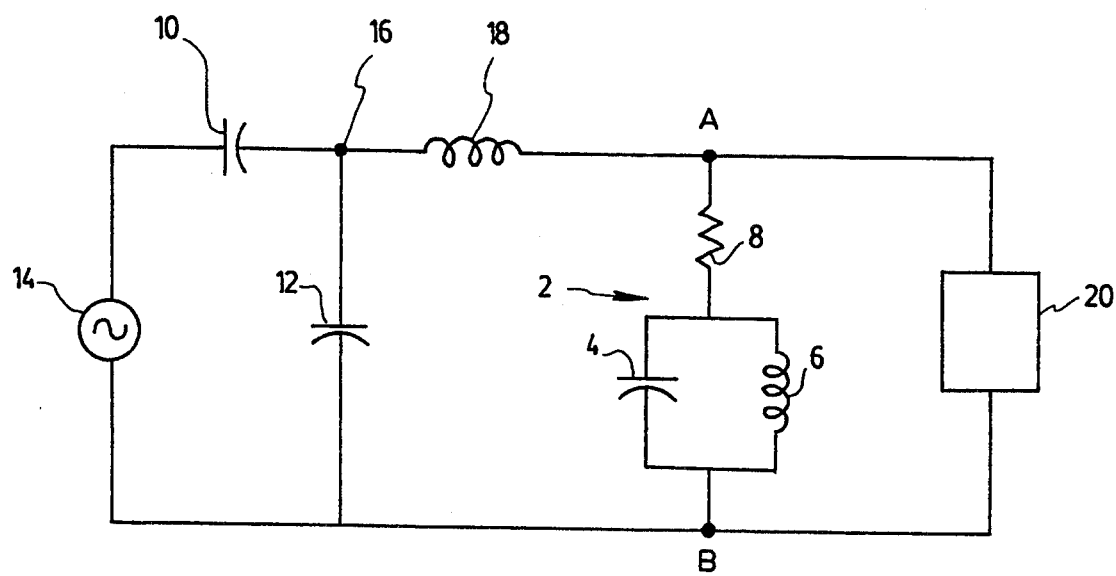
FIG. 2 is a circuit diagram illustrating a dampening circuit as shown in FIG. 1, in combination with a capacitive coupling system.

Referring now to FIG. 2, there is shown the dampening circuit 2 of FIG. 1, in combination with a capacitive coupling system. This coupling system comprises a capacitive voltage divider having at least two capacitors $C_1$ 10 and $C_2$ 12 connected in series. The divider is for connection in parallel to transmission lines of the power distribution network, which can be represented by a source 14 of $V_a \sin \omega t$. The divider has an output 16 for supplying the power signal.

The coupling system also comprises an inductance $L_1$ 18 having an end connected to the output 16 of the voltage divider, and another end connected to a power output A for supplying a load 20. The inductance $L_1$ 18 has a value of $1/[(2\pi f)^2(C_1+C_2)]$, the dampening circuit 2 being connected in parallel to the power output between points A and B, whereby dampening of resonance is obtained.

The dampening circuit 2 is used in combination with the capacitive coupling system of FIG. 2 for dampening resonances, ferroresonance or beatings. The circuit 20 shown in FIG. 2 is illustrated without its circuit breakers. The system can be a monophase system or a triphase system. As it can be seen in FIG. 2, this capacitive coupling system is more particularly a capacitive divider system.

In the past, this capacitive divider system was put into operation without the dampening circuit connected between points A and B. The two following publications discussed of this application: R. L. WILDE and J. CARR, "Customer Service Direct from Transmission Lines" IEEE Trans. on Power Apparatus and System, Vol. PAS-99, No. 1, Jan./Feb. 1980; and H. G. SARMIENTO, R. DE LA ROSA, V. CARILLO and J. VILAR, "Solving Electric Energy Supply To Rural Areas: The Capacitive Voltage Divider", IEEE Trans. on Power Delivery, Vol. 5, No. 1, Jan. 1990.

Figure 6:
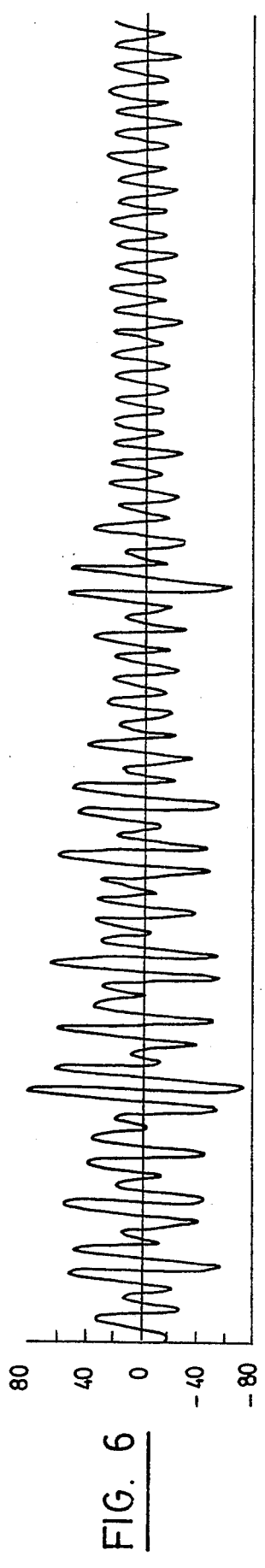
FIG. 6 is a diagram illustrating voltage oscillations with respect to time when the circuit shown in FIG. 2 is operating without dampening circuit between points A and B and when $L_1$ is a linear inductance.

The circuit shown in FIG. 2 was the subject matter of simulations by means of software EMTP by using the following values: $V_D$ which is the line voltage is 131500 V, $\omega$ is 377 which means that f is 60 Hz, $C_1$ is 0.94 $\mu$F, $C_2$ is 5.14 $\theta$F, $L_1$ is 1.16 H, R is 860$\Omega$, L is 1.16 H, and C is 6.11 $\mu$F. The load was a 500 KVA transformer operating on no load. This transformer has a phase-ground nominal efficient voltage of 14400 V which corresponds to natural voltage at the poles of $C_2$ when there is no load. The voltage at the poles of $C_2$, obtained during the connection of $C_2$ to the load 20 is illustrated in FIG. 6 when $L_1$ 18 is a linear inductance and without dampening circuit. The envelope of the voltage signal shows that the under harmonic ferroresonance component of the signal dies down with time. The vertical values of the diagram should be multiplied by $10^3$ volts to obtain real values.

Figure 7:
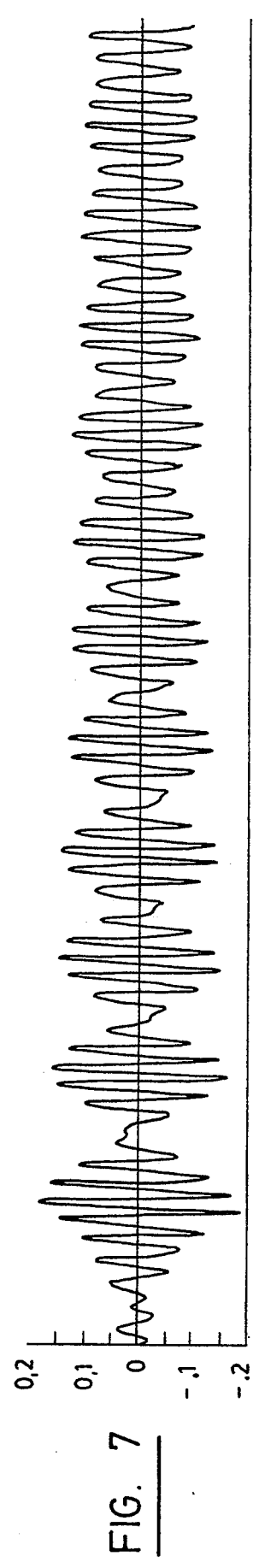
FIG. 7 is a diagram illustrating voltage oscillations with respect to time for the circuit diagram shown in FIG. 2, without a dampening circuit between points A and B and when $L_1$ is a saturable inductance.

FIG. 7 illustrates voltage at the poles of $C_2$, as the one shown in FIG. 6, but $L_1$ 18 is an inductance having a ferrite or transformer steel core which is saturable when it is operating beyond the efficient nominal voltage of 14400 V, and there is no dampening circuit. It can be seen that there is ferroresonance at the typical operating frequency of the system with beatings that slowly die down. The peak voltage at the poles of $C_2$ is around 90000 V after dampening of the beatings instead of dropping at the predetermined value of 20400 V. The vertical values of the diagram should be multiplied by $10^6$ volts to obtain real values.

Figure 8:
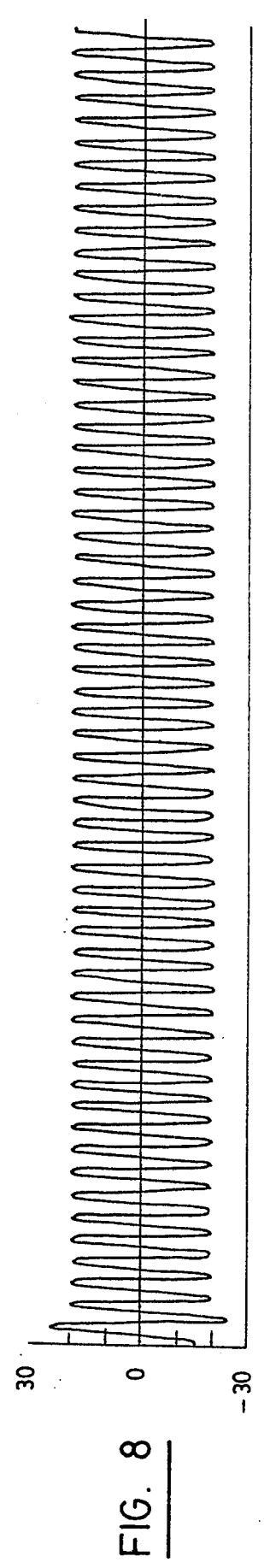
FIG. 8 is a diagram illustrating voltage oscillations with respect to time for the circuit diagram shown in FIG. 2, with a dampening circuit between points A and B and when $L_1$ is either a linear or saturable inductance.

Referring now to FIG. 8, there is shown the voltage at the poles of $C_2$ in the case where the dampening circuit is connected between points A and B, and $L_1$ is either linear or saturable beyond the efficient voltage of 14400 V. The result is the same regardless of the fact that inductance L of the dampening circuit is linear or saturable. Calculation and simulation allow determination of values of R, L and C with respect to different characteristics such as the values of load 20 and $L_1$ 18. The vertical values of the diagram should be multiplied by $10^3$ volts to obtain real values.

Figure 3:
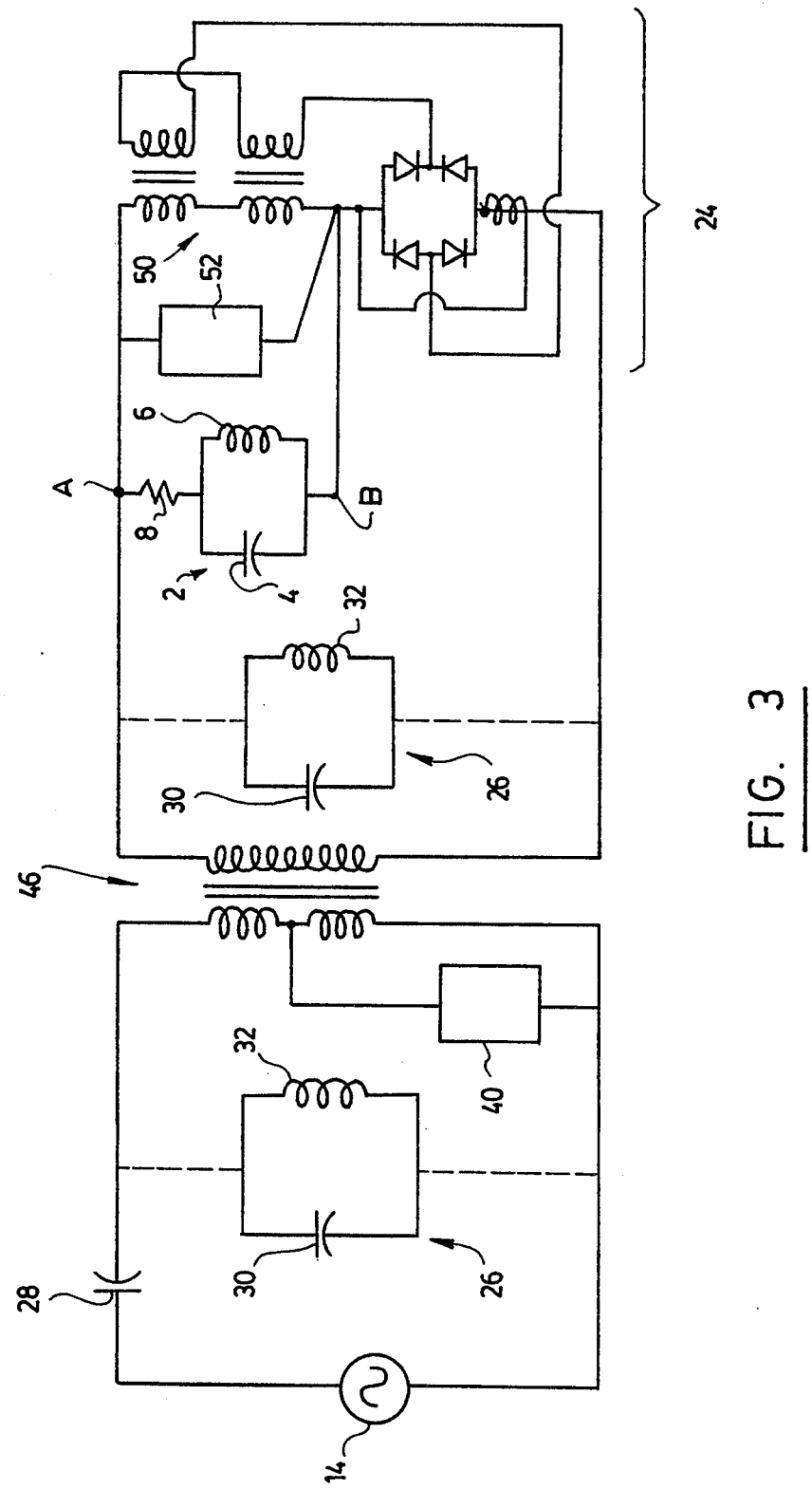
FIG. 3 illustrates a dampening circuit as shown in FIG. 1, in combination with a capacitive coupling system with a voltage regulator by means of a self-controlled variable inductor with air gaps.

Referring now to FIG. 3, there is shown a dampening circuit 2 in combination with a capacitive coupling system with a voltage regulation by means of a self-controlled variable inductor 24 with air gaps. This self-controlled variable inductor 24 with air gaps has been described in detail without the dampening circuit 2, in the following references: U.S. Pat. No. 4,620,144, "Self-Controlled Variable Inductor With Air Gaps" of Léonard BOLDUC (Oct. 28, 1986); U.S. Pat. No. 4,766,365, "Self-Regulated Transformer-Inductor With Air Gaps" of Léonard BOLDUC and Grégoire PARÉ (Aug. 23, 1988); and European Patent Publication No. 0,005,107, "Installation et Procédé d'Extraction de l'Énergie d'une Source Capacitive avec Régulation par Commutation Shunt" of Raymond BERTHIAUME, René BLAIS and Marcel DÉRY (Jul. 6, 1983). Consequently, we will not describe operation of this self-controlled variable inductor 24 in detail.

The dampening circuit 2 in combination with the capacitive coupling system as shown in FIG. 3, is used for dampening resonances, ferroresonance and beatings. In this FIG. 3, the circuit is shown without its circuit breakers. This circuit can be a monophase circuit or a triphase circuit.

Without the dampening circuit 2 connected between points A and B, the capacitive coupling system with the self-controlled variable inductor 24 can produce resonances and beatings.

The risk of beatings or oscillations is growing with the value of the electric filter 26 used for filtering harmonic signals generated by the self-controlled variable inductor 24 with air gaps. It has been found that an efficient dampening circuit 2 will have approximately 40% of the value of the electric filter, but it is preferable to optimize such result by means of simulation softwares.

Simulations have been done with the circuit shown in FIG. 3 by using the following values: $C_1$ 28 is 90 $\mu$F, $C_F$ 30 is 586.5 $\mu$F, $L_F$ 32 is 10.9 mH, C 4 is 234.6 $\mu$F, L 6 is 30 mH and R 8 is 25$\Omega$. In this simulation, there is no load 40. The resonances to be dampened are produced by the self-controlled variable inductor 24 with air gaps. The filter 26 can be either at the primary or the secondary winding of transformer 46. The transmission lines can be represented by a source 14 of $V_0 \sin \omega t$.

Figure 9:
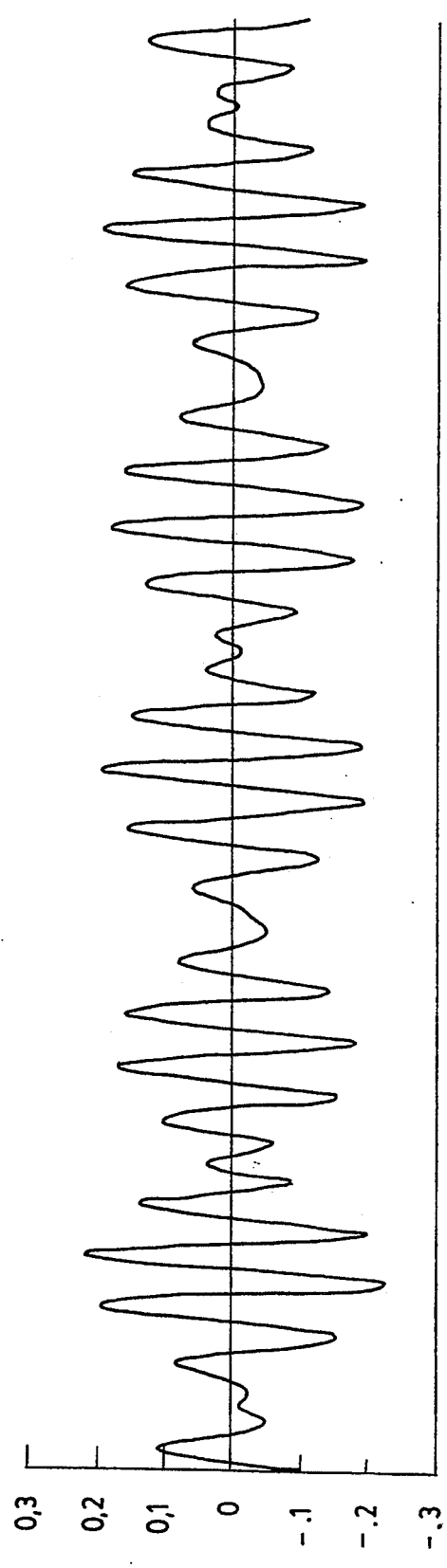
FIG. 9 is a diagram illustrating voltage oscillations with respect to time for the circuit diagram shown in FIG. 3 when the system is operating without a dampening circuit between points A and B.
Figure 10:
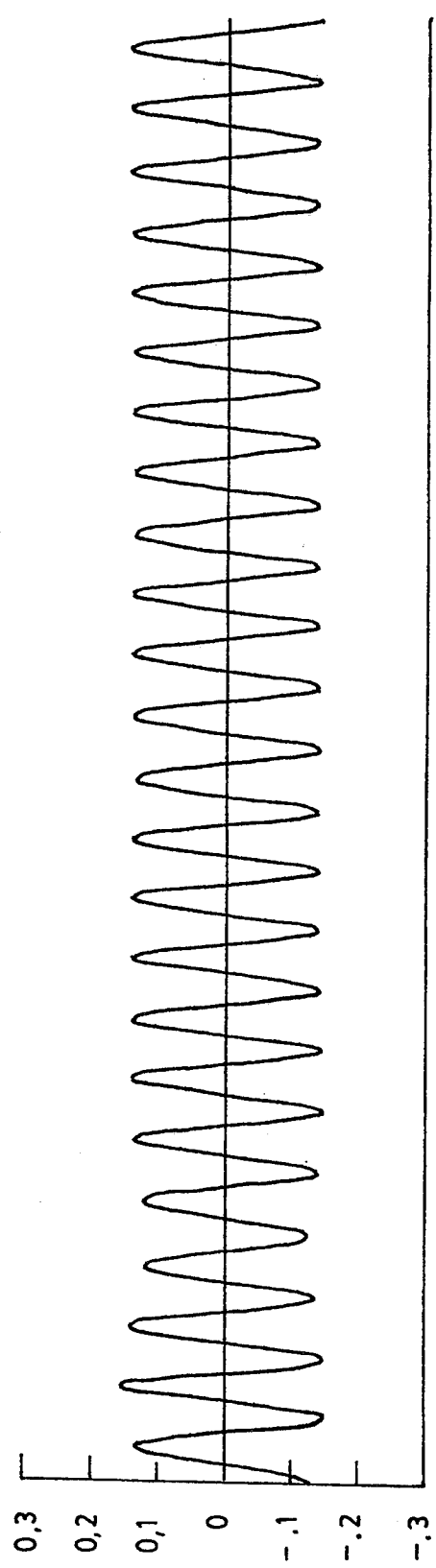
FIG. 10 is a diagram illustrating voltage oscillations with respect to time for the circuit diagram shown in FIG. 3 when the system is operating with a dampening circuit between points A and B.

Referring now to FIGS. 9 and 10, there is shown voltage signal with respect to time at the poles of the electric filter 26. The waveforms shown in these FIGS. 9 and 10 are presented from the moment where the voltage $V_0$ supplied by the lines, which was 400 V, becomes suddenly 500 V.

FIG. 9 shows the waveforms at the poles of the electric filter 26 for a system operating without dampening circuit 2. We can see that the beatings are not dampened.

Referring now to FIG. 10, there is shown the waveforms of the voltage at the poles of the electric filter 26 when a dampening circuit 2 is connected between points A and B of FIG. 3. We can see a slight resonance at the beginning which is dampened after few circles. In FIGS. 9 and 10, the vertical axis represent values that should be multiplied by $10^3$ V to obtain real values.

Referring now again to FIG. 3, there is shown the dampening circuit 2 in combination with a capacitive coupling system which comprises a capacitor $C_1$ 28 having a terminal for connection to transmission lines 14 of the distribution network, and a second terminal connected to transformer 46. The transformer 46 has a primary winding connected in series with the second terminal of capacitor $C_1$ 28, the primary winding having a center tap connector for connection to the load 40; and a secondary winding for connection to the self-controlled variable inductor 24. The self-controlled variable inductor 24 has a primary winding 50 connected in parallel to the dampening circuit 2, between points A and B, wherein dampening of the resonance is obtained. As the operation of the self-controlled variable inductor 24 with air gaps is described in detail in U.S. Pat. Nos. 4,620,144 and 4,766,365, it will not be described with further details. But it has to be noted that the element 52 is either an inductance $L_2$ or a capacitor $C_2$ for doing a fine adjustment of the voltage controlled by the self-controlled variable inductor 24. This element 52 is not essential.

The electric filter 26 is connected in parallel to either the primary or secondary winding of transformer 46 for filtering harmonic signals generated by self-controlled variable inductor 24. The filter comprises an inductance $L_F$ connected in parallel to a capacitor $C_F$ where:

$$L_F < \frac{1}{(2\pi f)^2 \, C_F}.$$

Figure 4:
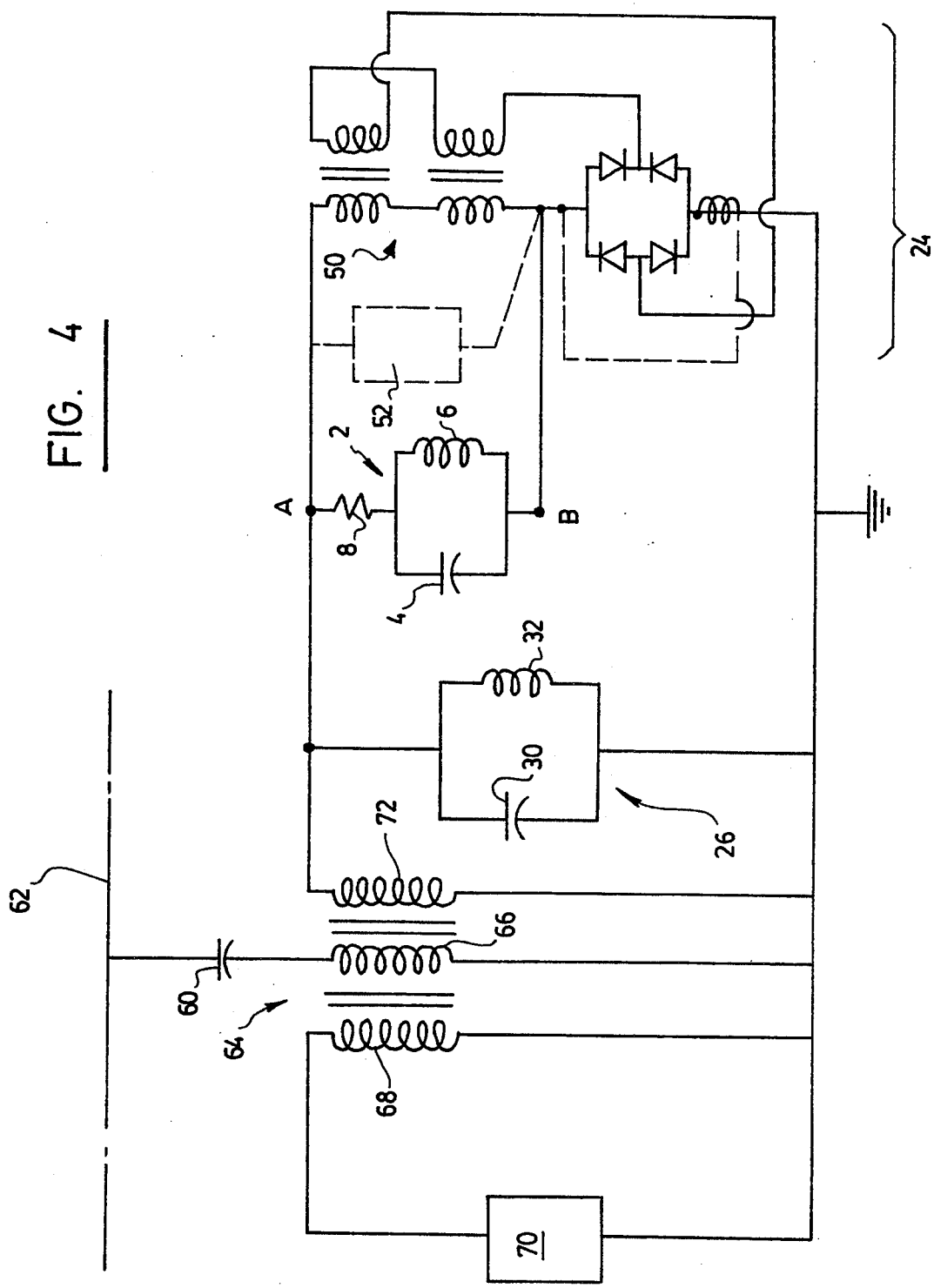
FIG. 4 illustrates a dampening circuit as shown in FIG. 1, in combination with a capacitive coupling system with a voltage regulator by means of a self-controlled variable inductor with air gaps, this embodiment being different from the one shown in FIG. 3.

Referring now to FIG. 4, there is shown the dampening circuit 2 in combination with a capacitive coupling system which comprises a capacitor $C_1$ 60 having a terminal for connection to transmission lines 62 of the power distribution network, and a second terminal connected to a transformer 64 having a primary winding 66 connected in series with the second terminal of the capacitor $C_1$ 60, a first secondary winding 68 for connection to the load 70, and a second secondary winding 72 for connection to the self-controlled variable inductor 24. The self-controlled variable inductor 24 has a primary winding 50 connected in parallel to the dampening circuit 2 whereby dampening of resonance is obtained. As mentioned in the description of FIG. 3, element 52 connected in parallel to the primary winding 50 of the self-controlled variable inductor 24 can be either an inductance $L_2$ or a capacitor $C_2$ for doing a fine adjustment of the voltage controlled by the self-controlled variable inductor 24. This element 52 is not essential.

The electric filter 26 is connected to the secondary winding 72, in parallel to the self-controlled variable inductor 24, for filtering harmonic signals generated by the self-controlled inductor 24. This filter 26 comprising an inductance $L_F$ 32 connected in parallel to a capacitor $C_F$ 30 where:

$$L_F < \frac{1}{(2\pi f)^2 \, C_F}.$$

Figure 5:
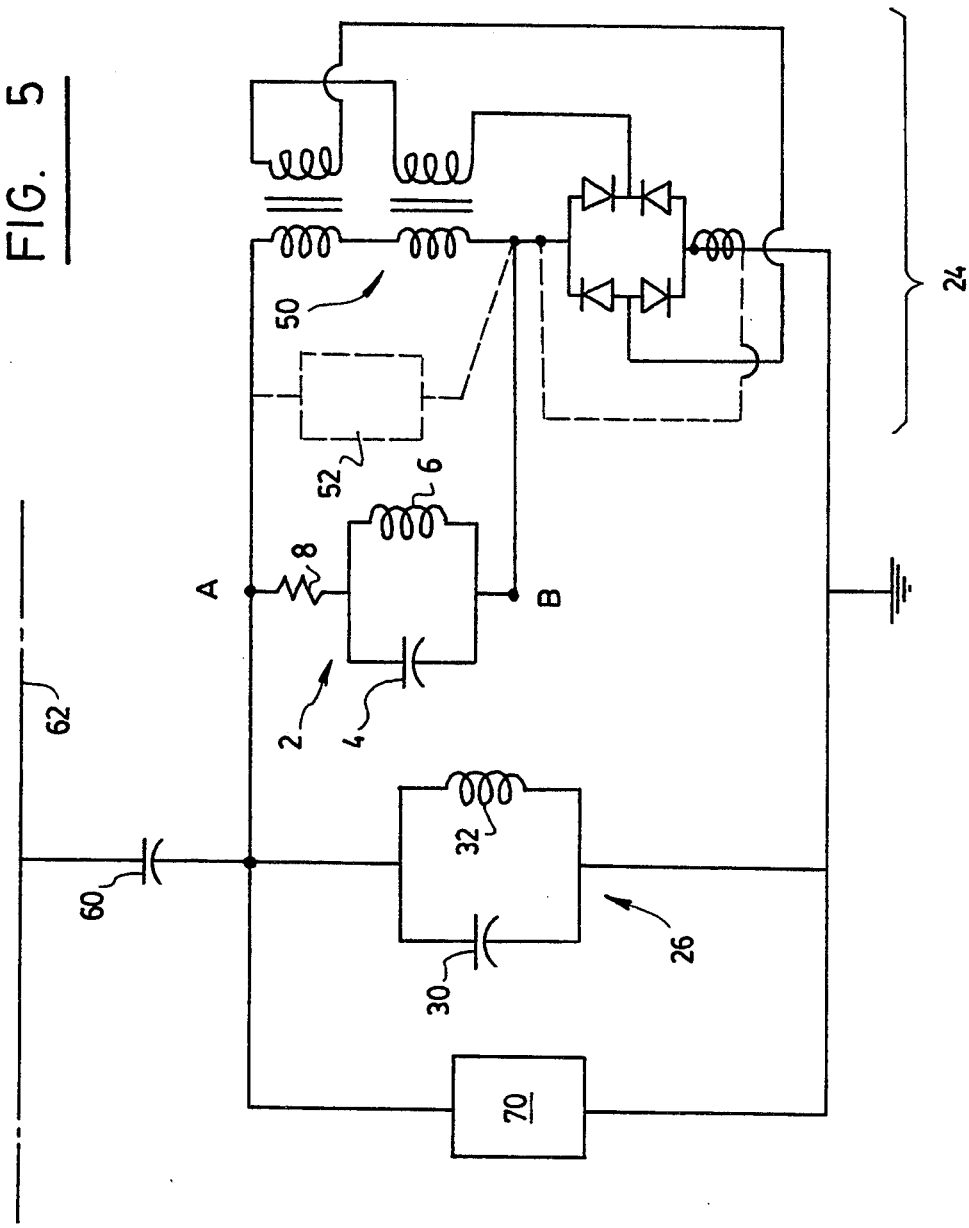
FIG. 5 illustrates a dampening circuit as shown in FIG. 1, in combination with a capacitive coupling system with a voltage regulator by means of a self-controlled variable inductor with air gaps, this embodiment is different from the ones shown in FIGS. 3 and 4.

Referring now to FIG. 5, there is shown the dampening circuit 2 in combination with a capacitive coupling system which comprises a capacitor $C_1$ 60 having a terminal for connection to transmission lines 62 of the power distribution network, and a second terminal connected to an electric filter 26, which is connected in parallel to the self-controlled variable inductor 24 for filtering harmonic signals generated by the self-controlled variable inductor 24. The filter 26 comprises an inductance $L_F$ 32 connected in parallel to a capacitor $C_F$ 30 where:

$$L_F < \frac{1}{(2\pi f)^2 \, C_F}.$$

The load 70 is connected in parallel to the electric filter 26. The self-controlled variable inductor 24 with air gaps is connected to the second terminal of the capacitor $C_1$ 60 and has a primary winding 50 connected in parallel to the dampening circuit 2, whereby dampening of resonance is obtained.

As for FIGS. 3 and 4, the element 52 is an inductance $L_2$ or a capacitor $C_2$ for doing a fine control of the voltage controlled by the self-controlled variable inductor 24. This element 52 is not essential.

Although the present invention has been explained hereinabove by way of preferred embodiments thereof, it should be pointed out that any modifications to these preferred embodiments, within the scope of the appended claims is not deemed to alter or change the nature in scope of the present invention.

We claim:

1. An electrical dampening circuit for dampening resonance of a power signal in a power distribution network, comprising a capacitor C, an inductance L connected in parallel to said capacitor C, and a resistance R connected in series with said capacitor C and inductance L, values of said capacitor C and inductance L being calculated so that:

$$(2\pi f)^2 LC = 1,$$

where f is frequency of said power signal; value of R being calculated so that:

$$3\sqrt{L/C} < R < (2/3)\sqrt{L/C},$$

whereby dampening of said resonance is obtained.

2. A dampening circuit according to claim 1, wherein:

$$2\sqrt{L/C} < R < \sqrt{L/C}.$$

3. A dampening circuit according to claim 1, in combination with a capacitive coupling system which comprises:

capacitive voltage divider having at least two capacitors $C_1$ and $C_2$ connected in series, said divider being for connection in parallel to transmission lines of said power distribution network, said divider having an output for supplying said power signal, an inductance $L_1$ having an end connected to said output of said voltage divider, and another end connected to a power output for supplying a load, said inductance $L_1$ having a value of $1/[(2\pi f)^2(C_1+C_2)]$, said dampening circuit being connected in parallel to said power output, whereby dampening of said resonance is obtained.

4. A dampening circuit in combination with a capacitive coupling system, according to claim 3 wherein f is 60 Hz, $C_1$ is 0.94 $\mu$F, $C_2$ is 5.14 $\mu$F, $L_1$ is 1.16 H, R is 860$\Omega$, L is 1.16 H, C is 6.11 $\mu$F and said load is a 500 KVA transformer operating on no load.

5. A dampening circuit according to claim 1, in combination with a capacitive coupling system which comprises:
   a capacitor $C_1$ having a terminal for connection to transmission lines of said power distribution network, and a second terminal connected to a supplying output, said supplying output being for connection to a load;
   a self-controlled variable inductor with air gaps, connected to said supplying output, said self-controlled variable inductor having a primary winding connected in parallel to said dampening circuit, whereby dampening of said resonance is obtained.

6. A dampening circuit in combination with a capacitive coupling system, according to claim 5, further comprising an electric filter connected to said supplying output, in parallel to said self-controlled variable inductor, for filtering harmonic signals generated by said self-controlled variable inductor, said filter comprising an inductance $L_F$ connected in parallel to a capacitor $C_F$ where:

$$L_F < \frac{1}{(2\pi f)^2 \, C_F}.$$

7. A dampening circuit in combination with a capacitive coupling system, according to claim 5, wherein said supplying output comprises a transformer having a primary winding connected in series with said second terminal of said capacitor $C_1$, a first secondary winding for connection to said load, and a secondary winding for connection to said self-controlled variable inductor.

8. A dampening circuit in combination with a capacitive coupling system, according to claim 7, further comprising an electric filter connected to said secondary winding, in parallel to said self-controlled variable inductor, for filtering harmonic signals generated by said self-controlled inductor, said filter comprising an inductance $L_F$ connected in parallel to a capacitor $C_F$ where:

$$L_F < \frac{1}{(2\pi f)^2 \, C_F}.$$

9. A dampening circuit in combination with a capacitive coupling system, according to claim 5, wherein said supplying output comprises a transformer having:
   a primary winding connected in series with said second terminal of said capacitor $C_1$, said primary winding having a centre tap connector for connection to said load; and
   a secondary winding for connection to said self-controlled variable inductor.

10. A dampening circuit in combination with a capacitive coupling system, according to claim 9, further comprising an electric filter connected in parallel to either said primary winding or said secondary winding for filtering harmonic signals generated by self-controlled variable inductor, said filter comprising an inductance $L_F$ connected in parallel to a capacitor $C_F$ where:

$$L_F < \frac{1}{(2\pi f)^2 \, C_F}.$$

11. A dampening circuit in combination with a capacitive coupling system, according to claim 10 wherein F is 60 Hz, $C_1$ is 90 $\mu$F, $C_F$ is 586.5 $\mu$F, $L_F$ is 10.9 mH, C is 234.6 $\mu$F, L is 30 mH, R is 25$\Omega$ and there is no load.

* * * * *